US012633438B2

(12) United States Patent
Jin et al.

(10) Patent No.: US 12,633,438 B2
(45) Date of Patent: May 19, 2026

(54) SOFT MAGNETIC POWDER, PREPARATION METHOD THEREFOR, AND USE THEREOF

(71) Applicant: HENGDIAN GROUP DMEGC MAGNETICS CO., LTD, Jinhua (CN)

(72) Inventors: Zhihong Jin, Jinhua (CN); Xianghua Han, Jinhua (CN); Jiangping Hu, Jinhua (CN); Jun Xu, Jinhua (CN)

(73) Assignee: HENGDIAN GROUP DMEGC MAGNETICS CO., LTD, Jinhua (CN)

( * ) Notice: Subject to any disclaimer, the term of this patent is extended or adjusted under 35 U.S.C. 154(b) by 369 days.

(21) Appl. No.: 18/256,581

(22) PCT Filed: Apr. 21, 2021

(86) PCT No.: PCT/CN2021/088596
§ 371 (c)(1),
(2) Date: Jun. 8, 2023

(87) PCT Pub. No.: WO2022/121208
PCT Pub. Date: Jun. 16, 2022

(65) Prior Publication Data

US 2024/0038421 A1 Feb. 1, 2024

(30) Foreign Application Priority Data

Dec. 9, 2020 (CN) ........................ 202011448283.8

(51) Int. Cl.
*H01F 1/147* (2006.01)
*B22F 1/145* (2022.01)
*H01F 41/02* (2006.01)

(52) U.S. Cl.
CPC .......... *H01F 1/14766* (2013.01); *B22F 1/145* (2022.01); *H01F 41/0206* (2013.01); *B22F 2301/35* (2013.01); *B22F 2304/10* (2013.01)

(58) Field of Classification Search
CPC ............ H01F 1/14766; H01F 41/0206; H01F 1/14733; H01F 1/14791; H01F 1/15308; H01F 41/0246; H01F 1/24; B22F 1/145; B22F 2301/35; B22F 2304/10
USPC ......................................................... 148/307
See application file for complete search history.

(56) References Cited

U.S. PATENT DOCUMENTS

2008/0117008 A1 5/2008 Komuro et al.
2010/0266861 A1* 10/2010 Tajima ................ C21D 8/1244 427/127
2016/0322139 A1 11/2016 Ye
2019/0392978 A1* 12/2019 Matsuura ................ H01F 17/04
2020/0135371 A1 4/2020 Tonoyama

FOREIGN PATENT DOCUMENTS

CN 1787127 A 6/2006
CN 1805086 A 7/2006
CN 102543350 A 7/2012
CN 103415899 B 11/2013
CN 104008844 A 8/2014
CN 104036899 A 9/2014
CN 104157389 A 11/2014
CN 106229104 A 12/2016
CN 108597719 A 9/2018
CN 110310794 A * 10/2019 ................ B22F 3/02
CN 110405201 A * 11/2019 ............. H01F 41/00
CN 112635147 A 4/2021
EP 3576110 A1 12/2019
JP H09111421 A 4/1997
JP H11329819 A 11/1999
JP 2003243215 A 8/2003
JP 2009117484 A 5/2009
JP 2009120915 A 6/2009
JP 2010251437 A 11/2010
JP 2010251600 A 11/2010
JP 2013171967 A 9/2013
JP 2019220609 A 12/2019
JP 2020072183 A 5/2020
WO 2014104391 A1 7/2014
WO 2020105603 A1 5/2020

OTHER PUBLICATIONS

CN-110310794-A Translation (Year: 2019).*
CN-110405201-A Translation (Year: 2019).*
Office Action for Japanese Patent Application No. 2023-529050, dated May 21, 2024.
International Search Report for International Patent Application No. PCT/CN2021/088596, mailed Sep. 7, 2021.
First Office Action for CN Patent Application No. 202011448283.8, issued Oct. 29, 2021.
Extended European Search Report for EP Patent Application No. 21901923.9, dated Oct. 18, 2024.

* cited by examiner

*Primary Examiner* — Danielle M. Carda
(74) *Attorney, Agent, or Firm* — Andrus Intellectual Property Law, LLP

(57) ABSTRACT

Soft magnetic powder, a preparation method therefor, and a use thereof. The preparation method comprises: (1) respectively independently performing surface silane coupling and silicon nitriding treatment on first magnetic powder, second magnetic powder, and third magnetic powder to obtain first magnetic powder, second magnetic powder, and third magnetic powder of which the surfaces are coated with compound films of —Si—N— chemical bonds; and (2) mixing the first magnetic powder, the second magnetic powder, and the third magnetic powder of which the surfaces are coated with the compound films of the —Si—N— chemical bonds, so as to obtain the soft magnetic powder.

8 Claims, No Drawings

SOFT MAGNETIC POWDER, PREPARATION METHOD THEREFOR, AND USE THEREOF

CROSS-REFERENCE TO RELATED APPLICATIONS

This is a national stage application filed under 37 U.S.C. 371 based on International Patent Application No. PCT/CN2021/088596, filed Apr. 21, 2021, which claims priority to Chinese Patent Application No. 202011448283.8, filed on Dec. 9, 2020, the disclosures of which are incorporated herein by reference in their entireties.

TECHNICAL FIELD

The present application belongs to the field of magnetic materials, and relates to a soft magnetic powder and a preparation method therefor and use thereof.

BACKGROUND

The development of electronic technology and the market trends have driven inductive components toward high frequency, miniaturization and low power consumption.

Common applications of soft magnetic powders include magnetic core components that act as magnetic material units with high magnetic permeability for limiting and guiding electrical, electromechanical and magnetic devices, such as reactors, transformers, choke coils and other inductors used in step-up circuits, power generation and substation equipment; the pressed powder cores used can be prepared from a mixture of soft magnetic material and soft magnetic powder containing adhesive material, and then this mixture containing magnetic powder and adhesive material is formed into a magnetic body or core by a pressure molding process. The inductors with such pressed powder cores are required to possess characteristics of high magnetic permeability, low iron losses, and excellent direct current superposition.

For electronic applications in general, especially, for alternating current (AC) applications, two key characteristics of core components are magnetic permeability and core losses. In this regard, the magnetic permeability of a material provides an indication of the ability of the material to be magnetized or the ability of the material to carry magnetic flux. The magnetic permeability is defined as a ratio of the induced magnetic flux to the magnetizing force or field intensity. When a magnetic material is exposed to a rapidly changing magnetic field, the total energy of the core is reduced by the hysteresis losses and/or eddy current losses. Hysteresis losses are caused by the required energy consumption exceeding the retained magnetic force inside the core component. Eddy current losses are caused by the generation of current in the core component (attributable to the changing flux caused by AC conditions) and essentially produce resistance losses.

In general, inductors for high-frequency applications are sensitive to core losses and require improved insulation characteristics in order to reduce the losses attributed to eddy currents. The simplest way to achieve this purpose is to thicken the insulation layer of each particle. However, the thicker the insulation layer, the lower the core density of the soft magnetic particles and the lower the flux density (the corresponding magnetic permeability will also be reduced). In addition, the attempt to increase flux density by pressing molding under high pressure can cause a high stress in the core, resulting in high hysteresis losses.

In order to manufacture soft magnetic powder cores with best key characteristics, it is necessary to increase both the resistivity and the density of the core. For this reason, the particles will ideally be coated with a thin insulating layer with high insulating properties. There exist different ways to solve this problem in the field of magnetic powders.

CN103415899B discloses that a phosphoric acid-based coating is formed on the surface of iron-based soft magnetic powder for pressed powder cores, and a silicone resin coating is formed on the surface of such coating. The phosphoric acid-based coating and silicone resin are used to coat the powder to form an insulating coating, which improves the insulation resistance and thermal stability of the powder and reduces eddy current losses.

JP2009120915A discloses an example of using inorganic substance coating (phosphate salt) to coat metal magnetic materials.

The phosphate salts in the above two documents have low toughness. The coating film may break sometimes under increased molding pressure, and may be unstable at annealing temperatures of more than 650° C., which can substantially increase eddy current losses and negatively impact inductive properties.

JP2010251437A discloses a coating method for a magnetic powder, wherein the coating contains magnesium fluoride ($MgF_2$) to improve the insulation of the surface of the magnetic powder and thus reduce the eddy current losses. The magnesium fluoride ($MgF_2$) in this document has low thermal stability and is not applicable to annealing process of more than 650° C.

US20080117008A1 discloses a magnet including a magnetic powder. The magnetic powder is coated with an oxide binder and an insulating film, wherein the insulating film is between the magnetic powder and the oxide binder. The oxide binder includes a glassy oxide such as silica.

The glassy oxide such as silica in this document is mechanically bonded to the magnetic powder. The glassy oxide is in a free state, distributed unevenly, and prone to peeling off from the magnetic powder under high pressure molding conditions, which greatly affects the effect of the insulating coating.

CN102543350A discloses a preparation method with the effect of high flux density, wherein an iron-based soft magnetic powder and a lubricant such as polyhydroxycarboxylic acid amide are mixed and prepared into a mixture, and the mixture is pressed and molded to obtain a pressed powder body. Although high pressing density (high flux density) is achieved by optimizing the lubricant system, it is not sufficient to meet the performance of low losses at high frequency and high magnetic permeability required by miniaturization of existing inductors. The flux density is required to be further improved.

Therefore, it is an urgent technical problem that needs to be solved about how to provide a hybrid magnetic powder for manufacturing inductive electronic components, especially a hybrid magnetic powder with high magnetic permeability and low losses at high frequency for high frequency applications.

SUMMARY

An object of the present application is to provide a soft magnetic powder and a preparation method therefor and use thereof. In the present application, three magnetic powders with different particle sizes and types treated by surface silane coupling and silicon nitriding are matched and packed, and achieve high packing density and ultra-high insulation resistance effect under conventional pressing pressure.

To achieve the object, the present application adopts the technical solutions below.

In a first aspect, the present application provides a preparation method of a soft magnetic powder, and the preparation method includes the following steps:

(1) subjecting a first magnetic powder, a second magnetic powder and a third magnetic powder to surface silane coupling treatment and silicon nitriding treatment independently to obtain a first magnetic powder coated with a compound film having —Si—N— chemical bonds, a second magnetic powder coated with a compound film having —Si—N— chemical bonds and a third magnetic powder coated with a compound film having —Si—N— chemical bonds, respectively;

(2) mixing the first magnetic powder coated with a compound film having —Si—N— chemical bonds, the second magnetic powder coated with a compound film having —Si—N— chemical bonds, and the third magnetic powder coated with a compound film having —Si—N— chemical bonds to obtain the soft magnetic powder.

In the above preparation method, the first magnetic powder, the second magnetic powder and the third magnetic powder are independently subjected to surface silane coupling treatment and silicon nitriding treatment. The two treatments work synergistically, form a dense compound film having —Si—N— chemical bonds on the surface of the soft magnetic powder with a certain thickness, and give the soft magnetic powder high packing density and high insulation resistance effect under conventional pressing pressure.

Meanwhile, the dense film cannot be formed only by the surface silane coupling. The simple silane coupling agent produces silanol after hydrolysis and has poor bonding capacity with the metal-based soft magnetic powder surface, the bonding is just the general physical bonding or hydrogen bond, and an integrated bonding cannot be realized. Thus, in the process of pressing the powder into a magnetic core, the film is easy to peel off and fail to provide the corresponding insulation and protection effect.

Optionally, the surface silane coupling treatment in step (1) includes immersing the first magnetic powder, the second magnetic powder and the third magnetic powder in a silane coupling agent-acetone solution independently and separately.

In the present application, the silane coupling agent-acetone solution is a solution prepared by mixing a silane coupling agent and acetone, wherein the silane coupling agent can be selected from KH550, KH540, KH560, KH792 or KH793, etc., optionally KH550.

Optionally, the silane coupling agent-acetone solution has a concentration of 5-15 wt %, such as 6 wt %, 7 wt %, 8 wt %, 9 wt %, 10 wt %, 12 wt % or 15 wt %, etc.

Optionally, an addition amount of the silane coupling agent in the silane coupling agent-acetone solution for immersing the first magnetic powder is 0.3-1 wt % of a weight of the first magnetic powder, such as 0.3 wt %, 0.4 wt %, 0.5 wt %, 0.6 wt %, 0.7 wt %, 0.8 wt %, 0.9 wt % or 1 wt %, etc.

Optionally, an addition amount of the silane coupling agent in the silane coupling agent-acetone solution for immersing the second magnetic powder is 0.6-1.2 wt % of a weight of the second magnetic powder, such as 0.6 wt %, 0.7 wt %, 0.8 wt %, 0.9 wt %, 1 wt %, 1.1 wt % or 1.2 wt %, etc.

Optionally, an addition amount of the silane coupling agent in the silane coupling agent-acetone solution for immersing the third magnetic powder is 1-2 wt % of a weight of the third magnetic powder, such as 1 wt %, 1.1 wt %, 1.2 wt %, 1.3 wt %, 1.4 wt %, 1.5 wt %, 1.6 wt %, 1.7 wt %, 1.8 wt %, 1.9 wt % or 2 wt %, etc.

The addition amount of silane coupling agent in the silane coupling agent-acetone solution is determined by the average particle size of the magnetic powder. The larger the magnetic powder particles, the less the amount of silane coupling agent will be, which is mainly related to the small specific surface area of the large powder particles. The smaller the powder particles, the larger the specific surface area, the larger the amount of silane coupling agent will be required.

Optionally, the silane coupling treatment in step (1) further includes stirring the first magnetic powder, the second magnetic powder and the third magnetic powder after being immersed and naturally volatilizing to dryness.

Optionally, the silicon nitriding treatment in step (1) includes subjecting the first magnetic powder, the second magnetic powder and the third magnetic powder after the silane coupling treatment to annealing separately in a tubular annealing furnace.

Optionally, a gas for an atmosphere of the annealing includes a nitrogen-ammonia mixture or nitrogen.

Compared with the general case where no annealing is performed after coupling, the magnetic powder with annealing after surface silane coupling agent treatment will have a dense —Si—N— compound film layer, which will significantly improve the insulation of the powder and the insulation of the pressed magnetic core (the corresponding core losses will be significantly reduced); the atmosphere gas used for annealing includes a nitrogen-ammonia mixture or nitrogen but cannot be hydrogen, air, oxygen, or argon, the main reason of which lies in that the dense —Si—N— compound film layer cannot be formed by using hydrogen, air, oxygen or argon, and thus the insulation effect cannot be achieved. However, the magnetic powder in the present application forms a silicon-containing film on the surface after surface silane coupling agent treatment, and then forms a dense —Si—N— compound film layer by annealing including a nitrogen-ammonia mixture or nitrogen; especially the —Si—N— compound has excellent temperature resistance and insulation; however, the corresponding film layer with excellent temperature resistance and insulation cannot be formed by atmospheres such as hydrogen, air, oxygen, or argon.

Optionally, the annealing is performed at 350-550° C., such as 350° C., 380° C., 400° C., 430° C., 450° C., 480° C., 500° C., 530° C. or 550° C., etc.

Optionally, the gas of the annealing has a total flow rate of 0.2-1 L/min, such as 0.2 L/min, 0.3 L/min, 0.4 L/min, 0.5 L/min, 0.6 L/min, 0.7 L/min, 0.8 L/min, 0.9 L/min or 1 L/min, etc.

Optionally, the annealing is performed for 1-5 h, such as 1 h, 2 h, 3 h, 4 h or 5 h, etc.

Optionally, the mixing in step (2) includes adding the first magnetic powder coated with a compound film having —Si—N— chemical bonds, the second magnetic powder coated with a compound film having —Si—N— chemical bonds, and the third magnetic powder coated with a compound film having —Si—N— chemical bonds in step (1) into a three-dimensional mixer and mixing them.

Optionally, the mixing in step (2) is performed for 1-2 h, such as 1.1 h, 1.2 h, 1.3 h, 1.4 h, 1.5 h, 1.6 h, 1.7 h, 1.8 h, 1.9 h or 2 h, etc.

As an optional technical solution, the preparation method of a soft magnetic material includes the following steps:

(1) immersing a first magnetic powder in a silane coupling agent-acetone solution with a concentration of 5-15 wt %, wherein an addition amount of the silane coupling agent is 0.3-1.0 wt % of a weight of the first magnetic powder, and then stirring the first magnetic powder and naturally volatilizing to dryness;

immersing a second magnetic powder in a silane coupling agent-acetone solution with a concentration of 5-15 wt %, wherein an addition amount of the silane coupling agent is 0.6-1.2 wt % of a weight of the second magnetic powder, and then stirring the second magnetic powder and naturally volatilizing to dryness;

immersing a third magnetic powder in a silane coupling agent-acetone solution with a concentration of 5-15 wt %, wherein an addition amount of the silane coupling agent is 1-2 wt % of a weight of the third magnetic powder, and then stirring the third magnetic powder and naturally volatilizing to dryness;

subjecting the first magnetic powder, the second magnetic powder and the third magnetic powder after the silane coupling treatment to annealing independently at 350-550° C. for 1-5 h under a nitrogen-ammonia mixture atmosphere in a tubular annealing furnace to obtain a first magnetic powder coated with a compound film having —Si—N— chemical bonds, a second magnetic powder coated with a compound film having —Si—N— chemical bonds and a third magnetic powder coated with a compound film having —Si—N— chemical bonds, respectively;

wherein, a total flow rate is 0.2-1 L/min during the annealing;

(2) adding the first magnetic powder coated with a compound film having —Si—N— chemical bonds, the second magnetic powder coated with a compound film having —Si—N— chemical bonds, and the third magnetic powder coated with a compound film having —Si—N— chemical bonds in step (1) into a three-dimensional mixer and mixing them for 1-2 h to obtain the soft magnetic powder.

In a second aspect, the present application provides a soft magnetic powder prepared by the preparation method of a soft magnetic powder according to the first aspect, and the soft magnetic powder includes a first magnetic powder, a second magnetic powder and a third magnetic powder; the first magnetic powder, the second magnetic powder and the third magnetic powder are all coated with a compound film on the surface, and a compound in the compound film contains —Si—N— chemical bonds In the present application, the compound film having —Si—N— chemical bonds coated on the first magnetic powder, the second magnetic powder and the third magnetic powder in the soft magnetic powder is tightly adhering to the surface of the magnetic powder, plays the role of surface insulation, and improves the insulation resistance of the soft magnetic powder; additionally, based on matching and packing the three magnetic powders, the magnetic flux density, magnetic permeability, and superposition performance under high current of the soft magnetic powder are thus improved, and the hysteresis losses is significantly reduced.

Optionally, the first magnetic powder includes any one or a combination of at least two of a Fe—Si—Al alloy, a Fe—Ni alloy, a Fe—Si alloy, a Fe—Si—Cr alloy or a Fe—Si—Ni alloy.

Optionally, the first magnetic powder has a weight proportion of 50-90% in the soft magnetic powder, such as 50%, 55%, 60%, 65%, 70%, 75%, 80%, 85% or 90%, etc.

Optionally, the first magnetic powder has a D50 of 15-45 μm, such as 15 μm, 20 μm, 25 μm, 30 μm, 35 μm, 40 μm or 45 μm, etc., optionally 21-30 μm.

The first magnetic powder in the above range of the median particle size has good magnetic permeability and low core losses when applied at high frequency conditions.

Optionally, the second magnetic powder includes any one or a combination of at least two of a Fe—Si—Al alloy, a Fe—Ni alloy, a Fe—Si alloy, a Fe—Si—Cr alloy, a Fe—Si—Ni alloy, or a carbonyl iron powder.

Optionally, the second magnetic powder has a weight proportion of 10-40% in the soft magnetic powder, such as 10%, 15%, 20%, 25%, 30%, 35% or 40%, etc.

Optionally, the second magnetic powder has a D50 of 2-10 μm, such as 2 μm, 3 μm, 4 μm, 5 μm, 6 μm, 7 μm, 8 μm, 9 μm or 10 μm, etc., optionally 4-7 μm.

The second magnetic powder in the above range of the median particle size can be effectively matched and packed with the first magnetic powder to obtain good magnetic permeability and core losses when applied at high frequency conditions.

Optionally, the third magnetic powder includes any one or a combination of at least two of a Fe—Si—B amorphous alloy, a Fe—Si—Cr—B amorphous alloy, or a carbonyl iron amorphous powder.

Optionally, the third magnetic powder has a weight proportion of 5-15% in the soft magnetic powder, such as 5%, 6%, 7%, 8%, 9%, 10%, 11%, 12%, 13%, 14% or 15%, etc.

Optionally, the third magnetic powder has a D50 of 2-8 μm, such as 2 μm, 3 μm, 4 μm, 5 μm, 6 μm, 7 μm or 8 μm, etc., optionally 3-7 μm.

The third magnetic powder in the above range of the median particle size can be effectively matched and packed with the first magnetic powder to obtain good magnetic permeability and core losses when applied at high frequency conditions.

Optionally, the compound film on the surface of the first magnetic powder has a thickness of 20-100 nm, such as 20 nm, 25 nm, 30 nm, 35 nm, 40 nm, 45 nm, 50 nm, 55 nm, 60 nm, 65 nm, nm, 75 nm, 80 nm, 85 nm, 90 nm, 95 nm or 100 nm, etc., optionally 30-70 nm.

Optionally, the compound film on the surface of the second magnetic powder has a thickness of nm, such as 10 nm, 15 nm, 20 nm, 25 nm, 30 nm, 35 nm or 40 nm, etc., optionally 15-25 nm.

Optionally, the compound film on the surface of the third magnetic powder has a thickness of 20-70 nm, such as 20 nm, 25 nm, 30 nm, 35 nm, 40 nm, 45 nm, 50 nm, 55 nm, 60 nm, 65 nm or nm, etc., optionally 30-50 nm.

The larger thickness of the compound film having —Si—N— chemical bonds means greater powder insulation resistance and lower eddy current losses at high frequency, but usually also greatly reduces the initial magnetic permeability and increases the hysteresis losses. Therefore, the thickness of the surface insulation coating of the first magnetic powder, the second magnetic powder and the third magnetic powder is significant for high frequency applications.

In a third aspect, the present application also provides a magnetic powder core, and the magnetic powder core is prepared from the soft magnetic powder according to the second aspect.

Compared with the prior art, the present application has the following beneficial effects.

In the present application, magnetic powders with different magnetic properties and different particle size distribution are matched and packed, and meanwhile, the magnetic powders are subjected to surface silane coupling and silicon nitriding treatment to form a dense compound film having —Si—N— chemical bonds on the surface, which has a good insulating effect and improves the insulation resistance of the soft magnetic powder. Besides, the soft magnetic powder can achieve high packing density (the corresponding flux density, magnetic permeability, and superposition performance under large current can be increased, and the hysteresis losses decreases) and ultra-high insulation resistance (the corresponding eddy current losses, especially under high frequency, decreases significantly) under conventional pressing pressure. Its initial magnetic permeability can be 72.3 or more, and the core losses can be reduced to 3795@1M*50 mT.

DETAILED DESCRIPTION

The technical solutions of the present application are further described below through specific embodiments. It should be apparent to those skilled in the art that the embodiments are only used for a better understanding of the present application and should not be construed as a specific limitation of the present application.

Silane coupling agents used in the following examples and comparative examples are all KH550.

Example 1

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 48 nm.

The compound film on the surface of the Fe—Ni powder has a thickness of 22 nm.

The compound film on the surface of the carbonyl iron amorphous powder has a thickness of 38 nm.

A preparation method of the soft magnetic powder includes the following steps.

(1) A Fe—Si—Al powder with a median particle size of 25.6 μm was immersed into a silane coupling agent-acetone solution with a concentration of 10 wt %, an addition amount of the silane coupling agent was 0.7 wt % of a weight of the Fe—Si—Al powder, and then the Fe—Si—Al powder was stirred and naturally volatilized to dryness;

a Fe—Ni powder with a median particle size of 5.8 μm was immersed into a silane coupling agent-acetone solution with a concentration of 13 wt %, an addition amount of the silane coupling agent was 1 wt % of a weight of the Fe—Ni powder, and then the Fe—Ni powder was stirred and naturally volatilized to dryness;

a carbonyl iron amorphous powder with a median particle size of 4.5 μm was immersed into a silane coupling agent-acetone solution with a concentration of 15 wt %, an addition amount of the silane coupling agent was 1.5 wt % of a weight of the carbonyl iron amorphous powder, and then the carbonyl iron amorphous powder was stirred and naturally volatilized to dryness;

the Fe—Si—Al powder after the silane coupling treatment was subjected to annealing at 380° C. for 3 h under a nitrogen atmosphere with a total flow rate of 0.6 L/min in a tubular annealing furnace;

the Fe—Ni powder after the silane coupling treatment was subjected to annealing at 420° C. for 3 h under a nitrogen atmosphere with a total flow rate of 0.6 L/min in a tubular annealing furnace;

the carbonyl iron amorphous powder after the silane coupling treatment was subjected to annealing at 420° C. for 3 h under a nitrogen atmosphere with a total flow rate of 0.6 L/min in a tubular annealing furnace;

a Fe—Si—Al powder coated with a compound film having —Si—N— chemical bonds, a Fe—Ni powder coated with a compound film having —Si—N— chemical bonds and a carbonyl iron amorphous powder coated with a compound film having —Si—N— chemical bonds were obtained.

(2) The Fe—Si—Al powder coated with a compound film having —Si—N— chemical bonds, the Fe—Ni powder coated with a compound film having —Si—N— chemical bonds and the carbonyl iron amorphous powder coated with a compound film having —Si—N— chemical bonds in step (1) were added into a three-dimensional mixer at a mixing ratio of 70:22:8 and mixed uniformly for 2 h to obtain the soft magnetic powder.

Example 2

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 20 nm.

The compound film on the surface of the Fe—Ni powder has a thickness of 22 nm.

The compound film on the surface of the carbonyl iron amorphous powder has a thickness of 38 nm.

This example differs from Example 1 in that the Fe—Si—Al powder has a median particle size of 21 μm, the Fe—Ni powder has a median particle size of 4 and the carbonyl iron amorphous powder has a median particle size of 4 μm; the rest of the preparation method and parameters are the same as in Example 1.

Example 3

This example provides a soft magnetic powder, and the soft magnetic powder includes a Fe—Ni powder, a carbonyl iron powder and a Fe—Si—B powder; the Fe—Ni powder, the carbonyl iron powder and the Fe—Si—B powder are all coated with a compound film on the surface, and a compound in the compound film contains —Si—N— chemical bonds.

The compound film on the surface of the Fe—Ni powder has a thickness of 100 nm.

The compound film on the surface of the carbonyl iron powder has a thickness of 10 nm.

The compound film on the surface of the Fe—Si—B powder has a thickness of 70 nm.

A preparation method of the soft magnetic powder includes the following steps.

(1) A Fe—Ni powder with a median particle size of 45 μm was immersed into a silane coupling agent-acetone solution with a concentration of 5 wt %, an addition amount of the silane coupling agent was 0.9 wt % of a weight of the Fe—Ni powder, and then the Fe—Ni powder was stirred and naturally volatilized to dryness;

a carbonyl iron powder with a median particle size of 7 μm was immersed into a silane coupling agent-acetone solution with a concentration of 5 wt %, an addition amount of the silane coupling agent was 0.8 wt % of a weight of the carbonyl iron powder, and then the carbonyl iron powder was stirred and naturally volatilized to dryness;

a Fe—Si—B powder with a median particle size of 7 μm was immersed into a silane coupling agent-acetone solution with a concentration of 5 wt %, an addition amount of the silane coupling agent was 1.8 wt % of a weight of the Fe—Si—B powder, and then the Fe—Si—B powder was stirred and naturally volatilized to dryness;

the Fe—Ni powder after the silane coupling treatment was subjected to annealing at 350° C. for 5 h under a nitrogen atmosphere with a total flow rate of 0.4 L/min in a tubular annealing furnace;

the carbonyl iron powder after the silane coupling treatment was subjected to annealing at 450° C. for 1 h under a nitrogen atmosphere with a total flow rate of 1 L/min in a tubular annealing furnace;

the Fe—Si—B powder after the silane coupling treatment was subjected to annealing at 420° C. for 3 h under a nitrogen atmosphere with a total flow rate of 0.6 L/min in a tubular annealing furnace;

a Fe—Ni powder coated with a compound film having —Si—N— chemical bonds, a carbonyl iron powder coated with a compound film having —Si—N— chemical bonds and a Fe—Si—B powder coated with a compound film having —Si—N— chemical bonds were obtained.

(2) The Fe—Ni powder coated with a compound film having —Si—N— chemical bonds, the carbonyl iron powder coated with a compound film having —Si—N— chemical bonds and the Fe—Si—B powder coated with a compound film having —Si—N— chemical bonds in step (1) were added into a three-dimensional mixer at a mixing ratio of 60:30:10 and mixed uniformly for 1 h to obtain the soft magnetic powder.

Example 4

This example differs from Example 1 in that a gas for the atmosphere of the silicon nitriding treatment is a nitrogen-ammonia mixture; the rest of the preparation method and parameters are the same as in Example 1.

Example 5

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 17 nm.

The compound film on the surface of the Fe—Ni powder has a thickness of 22 nm.

The compound film on the surface of the carbonyl iron amorphous powder has a thickness of 38 nm.

This example differs from Example 1 in that the Fe—Si—Al powder has a median particle size of 14 μm; the rest of the preparation method and parameters are the same as in Example 1.

Example 6

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 110 nm.

The compound film on the surface of the Fe—Ni powder has a thickness of 22 nm.

The compound film on the surface of the carbonyl iron amorphous powder has a thickness of 38 nm.

This example differs from Example 1 in that the Fe—Si—Al powder has a median particle size of 46 μm; the rest of the preparation method and parameters are the same as in Example 1.

Example 7

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 48 nm.

The compound film on the surface of the Fe—Ni powder has a thickness of 22 nm.

The compound film on the surface of the carbonyl iron amorphous powder has a thickness of 38 nm.

This example differs from Example 1 in that the Fe—Ni powder has a median particle size of 2 μm; the rest of the preparation method and parameters are the same as in Example 1.

Example 8

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 48 nm.

The compound film on the surface of the Fe—Ni powder has a thickness of 22 nm.

The compound film on the surface of the carbonyl iron amorphous powder has a thickness of 38 nm.

This example differs from Example 1 in that the Fe—Ni powder has a median particle size of 10 μm; the rest of the preparation method and parameters are the same as in Example 1.

Example 9

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 48 nm.

The compound film on the surface of the Fe—Ni powder has a thickness of 7 nm.

The compound film on the surface of the carbonyl iron amorphous powder has a thickness of 38 nm.

This example differs from Example 1 in that the carbonyl iron amorphous powder has a median particle size of 2 μm; the rest of the preparation method and parameters are the same as in Example 1.

Example 10

This example provides a soft magnetic powder, and the soft magnetic powder includes a Fe—Si—Al powder, a Fe—Ni powder and a carbonyl iron amorphous powder; the Fe—Si—Al powder, Fe—Ni powder and carbonyl iron amorphous powder are all coated with a compound film on the surface, and a compound in the compound film contains —Si—N— chemical bonds.

The compound film on the surface of the Fe—Si—Al powder has a thickness of 48 nm.

The compound film on the surface of the Fe—Ni powder has a thickness of 22 nm.

The compound film on the surface of the carbonyl iron amorphous powder has a thickness of 75 nm.

This example differs from Example 1 in that the carbonyl iron amorphous powder has a median particle size of 8 μm; the rest of the preparation method and parameters are the same as in Example 1.

Example 11

This example differs from Example 1 in that a gas for the atmosphere of the silicon nitriding treatment is air; the rest of the preparation method and parameters are the same as in Example 1.

Example 12

This example differs from Example 1 in that a gas for the atmosphere of the silicon nitriding treatment is hydrogen; the rest of the preparation method and parameters are the same as in Example 1.

Comparative Example 1

This comparative example provides a soft magnetic powder, and the soft magnetic powder includes a Fe—Si—Al powder and a Fe—Ni powder; the Fe—Si—Al powder and Fe—Ni powder are both coated with a compound film on the surface, and a compound in the compound film contains —Si—N— chemical bonds.

The compound film on the surface of the Fe—Si—Al powder has a thickness of 48 nm.

The compound film on the surface of the Fe—Ni powder has a thickness of 22 nm.

Except for including no treatment for the carbonyl iron amorphous powder in the preparation method, the rest of the preparation process and parameters are the same as in Example 1.

Comparative Example 2

This comparative example provides a soft magnetic powder, and the soft magnetic powder includes a Fe—Si—Al powder and a carbonyl iron amorphous powder; the Fe—Si—Al powder and carbonyl iron amorphous powder are both coated with a compound film on the surface, and a compound in the compound film contains —Si—N— chemical bonds.

The compound film on the surface of the Fe—Si—Al powder has a thickness of 48 nm.

The compound film on the surface of the carbonyl iron amorphous powder has a thickness of 38 nm.

Except for including no treatment for the Fe—Ni powder in the preparation method, the rest of the preparation process and parameters are the same as in Example 1.

Comparative Example 3

This comparative example provides a soft magnetic powder, and the soft magnetic powder includes a Fe—Ni powder and a carbonyl iron amorphous powder; the Fe—Ni powder and carbonyl iron amorphous powder are both coated with a compound film on the surface, and a compound in the compound film contains —Si—N— chemical bonds.

The compound film on the surface of the Fe—Ni powder has a thickness of 22 nm.

The compound film on the surface of the carbonyl iron amorphous powder has a thickness of 38 nm.

Except for including no treatment for the Fe—Si—Al powder in the preparation method, the rest of the preparation process and parameters are the same as in Example 1.

Comparative Example 4

This comparative example provides a soft magnetic powder, and the soft magnetic powder includes a Fe—Si—Al powder, a Fe—Ni powder and a carbonyl iron amorphous powder.

In the preparation method, no surface silane coupling treatment and silicon nitriding treatment is performed on the Fe—Si—Al powder, Fe—Ni powder and carbonyl iron amorphous powder; the rest of the preparation process and parameters are the same as in Example 1.

Comparative Example 5

This comparative example provides a soft magnetic powder, and the soft magnetic powder includes a Fe—Si—Al powder, a Fe—Ni powder and a carbonyl iron amorphous powder.

In the preparation method, the Fe—Si—Al powder, Fe—Ni powder and carbonyl iron amorphous powder are only subjected to surface silane coupling treatment but not silicon nitriding treatment; the rest of the preparation process and parameters are the same as in Example 1.

The soft magnetic powders prepared by Examples 1-12 and Comparative Examples 1-5 were tested by the following methods and procedures.

1. The soft magnetic powders prepared by Examples 1-12 and Comparative Examples 1-5 were separately and independently added into a coating machine, added with 1.0 wt % of silicone organic resin binder (a acetone solution with 10 wt % concentration) slowly, and pelletized in a semi-dry state into columnar soft magnetic powder materials with a certain circular degree by a pelletizing machine; 2. the soft magnetic powder material was pressed and molded at 1500 MPa to obtain a Φ26.92*Φ14.73*11.18 magnetic core; 3. the molded magnetic core was annealed at 700° C. to remove the pressing stress of the magnetic core, wherein the atmosphere was nitrogen; 4. measuring and analyzing: the annealed magnetic core was wrapped by coils by 30 turns, and measured for the initial magnetic permeability pi by UK Wayne Kerr WK3260B precision magnetics analyzer; the coils were wound by 30*5 turns, and the magnetic core was measured for core losses at different frequencies and external magnetic fields by Japan Iwatsu SY-8218 soft magnetic B-H analyzer, and for the present application, the characteristic value at high frequency 1 M and external magnetic field 50 mT is mainly expected.

Table 1 shows the results of Examples 1-12 and Comparative Examples 1-5.

TABLE 1

| | Initial magnetic permeability μi (target 70-100) | Core losses Pcv, 1M*50 mT (target ≤ 4000) |
|---|---|---|
| Example 1 | 91.7 | 3567 |
| Example 2 | 72.3 | 2758 |
| Example 3 | 95 | 3795 |
| Example 4 | 87.3 | 3329 |
| Example 5 | 67.3 | 2654 |
| Example 6 | 102.3 | 4167 |
| Example 7 | 71.3 | 2955 |
| Example 8 | 99.2 | 3986 |
| Example 9 | 63.9 | 3162 |
| Example 10 | 93.8 | 4782 |
| Example 11 | 93.1 | 5218 |
| Example 12 | 86.9 | 4529 |
| Comparative Example 1 | 86.3 | 4201 |
| Comparative Example 2 | 62.8 | 3567 |
| Comparative Example 3 | 95.4 | 5891 |
| Comparative Example 4 | 87.0 | 7309 |
| Comparative Example 5 | 92.1 | 6283 |

It can be seen from the results of Example 1 and Example 5 that when the median particle size of Fe—Si—Al powder is less than 15 μm, the thickness of its corresponding surface compound film will also decrease to less than or equal to 20 nm, and in that case, the initial magnetic permeability of Example 5 is less than 70.

It can be seen from the results of Example 1 and Example 6 that when the median particle size of Fe—Si—Al powder is more than 45 μm, the thickness of its corresponding surface compound film will also increase to more than or equal to 100 nm, the powder particles are too large, and thus the core losses will further deteriorate.

It can be seen from the results of Example 1 and Examples 5-10 that in a case where any one of the three magnetic powders, no matter it is the first magnetic powder or the second magnetic powder or the third magnetic powder, has a median particle size more than or less than the value range of the present application, the initial magnetic permeability or losses will change in a certain degree, and thus the performance of the magnetic powder core will significantly deteriorate.

It can be seen from the results of Example 1 and Examples 11 and 12 that the magnetic powder cannot form a dense —Si—N— compound film layer by annealing in an air or hydrogen atmosphere, which leads to extremely poor insulation performance, and thus the losses of the magnetic powder core will further deteriorate.

It can be seen from the results of Example 1 and Comparative Examples 1-3 that the mixtures of two magnetic powders all have worse performance than the mixture of three magnetic powders, which results in the phenomenon that the magnetic permeability cannot be improved, or the losses increases. It can be seen from the results of Example 1 and Comparative Example 4 that without surface silane coupling treatment and silicon nitriding treatment of the magnetic powder, the powder will have poor surface insulation and high losses under high frequency conditions.

It can be seen from the results of Example 1 and Comparative Example 5 that the losses will also increase significantly when only the surface silane coupling treatment is performed without the silicon nitriding treatment.

The above embodiments provide further details of the objects, technical solutions and beneficial effects of the present application, and it is to be understood that the above described are only embodiments of the present application and are not intended to limit the present application.

What is claimed is:

1. A preparation method of a soft magnetic powder, comprising the following steps:

(1) subjecting a first magnetic powder, a second magnetic powder and a third magnetic powder to surface silane coupling treatment and silicon nitriding treatment independently to obtain a first magnetic powder coated with a compound film having —Si—N— chemical bonds, a second magnetic powder coated with a compound film having —Si—N— chemical bonds and a third magnetic powder coated with a compound film having —Si—N— chemical bonds, respectively;

wherein the surface silane coupling treatment in step (1) comprises immersing the first magnetic powder, the second magnetic powder and the third magnetic powder in a silane coupling agent-acetone solution independently and separately;

wherein the silicon nitriding treatment in step (1) comprises subjecting the first magnetic powder, the second magnetic powder and the third magnetic powder after the silane coupling treatment to annealing separately in a tubular annealing furnace;

wherein a gas for an atmosphere of the annealing comprises a nitrogen-ammonia mixture; and (2) mixing the first magnetic powder coated with a compound film having —Si—N— chemical bonds, the second magnetic powder coated with a compound film having —Si—N— chemical bonds, and the third magnetic powder coated with a compound film having —Si—N— chemical bonds to obtain the soft magnetic powder.

2. The preparation method of a soft magnetic powder according to claim 1, wherein the silane coupling agent-acetone solution has a concentration of the silane coupling agent of 5-15 wt %.

3. The preparation method of a soft magnetic powder according to claim 1, wherein an amount of the silane coupling agent in the silane coupling agent-acetone solution for immersing the first magnetic powder is 0.3-1 wt % of a weight of the first magnetic powder.

4. The preparation method of a soft magnetic powder according to claim 3, wherein an amount of the silane coupling agent in the silane coupling agent-acetone solution for immersing the second magnetic powder is 0.6-1.2 wt % of a weight of the second magnetic powder;

wherein an amount of the silane coupling agent in the silane coupling agent-acetone solution for immersing the third magnetic powder is 1-2 wt % of a weight of the third magnetic powder; and wherein the silane coupling treatment in step (1) further comprises stirring the first magnetic powder, the second magnetic powder and the third magnetic powder after being immersed and naturally volatilizing to dryness.

5. The preparation method of a soft magnetic powder according to claim 1, wherein the mixing in step (2) comprises adding the first magnetic powder coated with a compound film having —Si—N— chemical bonds, the second magnetic powder coated with a compound film having —Si—N— chemical bonds, and the third magnetic powder coated with a compound film having —Si—N— chemical bonds in step (1) into a three-dimensional mixer and mixing the first magnetic powder, the second magnetic powder, and third magnetic powder.

6. The preparation method of a soft magnetic powder according to claim 5, wherein, the mixing in step (2) is performed for 1-2 h.

7. The preparation method of a soft magnetic powder according to claim 1, wherein the preparation method comprises:

(1) immersing the first magnetic powder in a silane coupling agent-acetone solution with a concentration of the silane coupling agent of 5-15 wt %, wherein an amount of the silane coupling agent is 0.3-1.0 wt % of a weight of the first magnetic powder, and then stirring the first magnetic powder and naturally volatilizing to dryness;

immersing the second magnetic powder in a silane coupling agent-acetone solution with a concentration of the silane coupling agent of 5-15 wt %, wherein an amount of the silane coupling agent is 0.6-1.2 wt % of a weight of the second magnetic powder, and then stirring the second magnetic powder and naturally volatilizing to dryness;

immersing the third magnetic powder in a silane coupling agent-acetone solution with a concentration of the silane coupling agent of 5-15 wt %, wherein an amount of the silane coupling agent is 1-2 wt % of a weight of the third magnetic powder, and then stirring the third magnetic powder and naturally volatilizing to dryness;

subjecting the first magnetic powder, the second magnetic powder and the third magnetic powder after the silane coupling treatment to annealing independently at 350-550° C. for 1-5 h under the nitrogen-ammonia mixture atmosphere in the tubular annealing furnace to obtain the first magnetic powder coated with the compound film having —Si—N— chemical bonds, the second magnetic powder coated with the compound film having —Si—N— chemical bonds and the third magnetic powder coated with the compound film having —Si—N— chemical bonds, respectively; and wherein a total flow rate is 0.2-1 L/min during the annealing;

(2) adding the first magnetic powder coated with the compound film having —Si—N— chemical bonds, the second magnetic powder coated with the compound film having —Si—N— chemical bonds, and the third magnetic powder coated with the compound film having —Si—N— chemical bonds in step (1) into a three-dimensional mixer and mixing the first magnetic powder, the second magnetic powder, and third magnetic powder for 1-2 h to obtain the soft magnetic powder.

8. The preparation method of a soft magnetic powder according to claim 1, wherein the annealing is performed at 350-550° C.;

wherein, the gas of the annealing has a total flow rate of 0.2-1 L/min; and wherein, the annealing is performed for 1-5 h.

* * * * *